United States Patent
Pyo

(10) Patent No.: US 9,219,943 B2
(45) Date of Patent: *Dec. 22, 2015

(54) BROADCAST RECEIVING APPARATUS AND CONTROL METHOD THEREOF

(71) Applicant: SAMSUNG ELECTRONICS CO., LTD., Suwon-si (KR)

(72) Inventor: Se-jin Pyo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,979

(22) Filed: Aug. 13, 2013

(65) Prior Publication Data

US 2013/0332949 A1 Dec. 12, 2013

Related U.S. Application Data

(63) Continuation of application No. 12/533,444, filed on Jul. 31, 2009, now Pat. No. 8,531,606.

(30) Foreign Application Priority Data

Nov. 5, 2008 (KR) .................. 10-2008-0109525

(51) Int. Cl.
| | |
|---|---|
| *H04N 5/50* | (2006.01) |
| *H04N 21/442* | (2011.01) |
| *H04H 20/12* | (2008.01) |
| *H04H 60/32* | (2008.01) |
| *H04N 5/44* | (2011.01) |
| *H04N 17/04* | (2006.01) |
| *H04N 21/466* | (2011.01) |
| *H04N 21/488* | (2011.01) |

(52) U.S. Cl.
CPC ......... *H04N 21/44222* (2013.01); *H04H 20/12* (2013.01); *H04H 60/32* (2013.01); *H04N 5/4401* (2013.01); *H04N 17/045* (2013.01); *H04N 21/4667* (2013.01); *H04N 21/488* (2013.01)

(58) Field of Classification Search
CPC ..... H04H 20/12; H04N 60/32; H04N 5/4401; H04N 17/045; H04N 21/44222; H04N 21/4667; H04N 21/488
USPC ................. 348/570, 725, 731–733; 725/1–21
See application file for complete search history.

(56) References Cited

U.S. PATENT DOCUMENTS

| | | | |
|---|---|---|---|
| 6,768,721 B1 | 7/2004 | Schmitz et al. | |
| 8,531,606 B2 * | 9/2013 | Pyo ............................. | 348/570 |

(Continued)

OTHER PUBLICATIONS

Communication dated Jan. 19, 2015 issued by the Korean Intellectual Property Office in counterpart Korean Patent Application No. 10-2008-0109525.

*Primary Examiner* — Michael Lee
(74) *Attorney, Agent, or Firm* — Sughrue Mion, PLLC

(57) ABSTRACT

A broadcast receiving apparatus which accumulates and stores a status value of a broadcast signal is provided. The broadcast receiving apparatus includes a signal receiver which receives a broadcast signal, a decoder which decodes the received broadcast signal, a signal detector which detects a signal status of at least one of the received broadcast signal and the decoded broadcast signal, and a storage unit which accumulates and stores a status value of the broadcast signal detected by the signal detector. Accordingly, the past signal status of the broadcast receiving apparatus can be easily recognized.

18 Claims, 10 Drawing Sheets

(56) References Cited

U.S. PATENT DOCUMENTS

| | | |
|---|---|---|
| 2002/0083451 A1 | 6/2002 | Gill et al. |
| 2003/0023967 A1 | 1/2003 | Kim |
| 2004/0102167 A1 | 5/2004 | Shim et al. |
| 2005/0114879 A1 | 5/2005 | Kamieniecki |

* cited by examiner

BROADCAST RECEIVING APPARATUS AND CONTROL METHOD THEREOF

CROSS-REFERENCE TO RELATED APPLICATIONS

This is a continuation application of U.S. patent application Ser. No. 12/533,444 filed in the U.S. Patent and Trademark Office on Jul. 31, 2009, which claims priority from Korean Patent Application No. 10-2008-109525, filed on Nov. 5, 2008, in the Korean Intellectual Property Office, the disclosures of which are incorporated herein by reference in their entirety.

BACKGROUND OF THE INVENTION

1. Field of the Invention

Apparatuses and methods consistent with the present invention relate to a broadcast receiving apparatus and a control method thereof, and more particularly, to a broadcast receiving apparatus which accumulates and stores a status value of a broadcast signal and a control method thereof.

2. Description of the Related Art

A representative apparatus of image display apparatuses is a television (TV), which tunes to broadcast signals transmitted from a broadcasting station according to user's selection and displays the broadcast signals on a screen. With the development of multimedia technology, such a television is undergoing a gradual transformation from an analog format to a digital format.

A digital broadcast receiver has a role of receiving various channels through a tuner, and demodulating and outputting the channels to a display. In the process of processing channels, the intensity of a signal may change depending on channel or on time slot for a single channel.

That is, in some situations a user may not be able to watch a broadcast due to a weak signal which intermittently occurs. In this case, even if the user requests service from a broadcast content provider or a broadcast receiver manufacturer to fix a problem that occurred in the past, the user may have difficulty recreating the problem.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a broadcast receiving apparatus which accumulates and stores a status value of a broadcast signal and a control method thereof.

According to an aspect of the present invention, a broadcast receiving apparatus includes a signal receiver which receives a broadcast signal, a decoder which decodes the received broadcast signal, a signal detector which detects a signal status of at least one of the received broadcast signal and the decoded broadcast signal, and a storage unit which accumulates and stores a status value of the broadcast signal detected by the signal detector.

The broadcast receiving apparatus may further include a display unit which displays the accumulated status value of the broadcast signal.

The broadcast receiving apparatus may further include a signal statistic unit which calculates a statistic regarding the accumulated status value of the broadcast signal and stores the statistic to the storage unit, and the display unit may display the calculated statistic regarding the status value of the broadcast signal.

The broadcast receiving apparatus may further include a controller which controls the display unit to display the accumulated status value of the broadcast signal using at least one of a numerical value and a graph.

The broadcast receiving apparatus may further include a controller which controls the display unit to display the statistic regarding the status value of the broadcast signal using at least one of a numeral value and a graph.

The controller may display the status value of the broadcast signal or the statistic regarding the status value of the broadcast signal such that a time during which the status value of the broadcast signal is less than a predetermined value is distinguished from other times.

The controller may display the status value of the broadcast signal or the statistic regarding the status value of the broadcast signal such that the signal status of the received broadcast signal is distinguished from the signal status of the decoded broadcast signal.

The controller may display at least one of the status value of the broadcast signal and the statistic regarding the status value of the broadcast signal for each channel.

The signal statistic unit may calculate at least one of a total watching time of at least one channel, a time during which the status value of the broadcast signal is less than a predetermined value, a proportion of the time during which the status value of the broadcast signal is less than a predetermined value to the total watching time, and a statistic for a preset time slot, and may provide a result of calculating to the storage unit.

The signal status of the broadcast signal may indicate at least one of intensity and quality of a broadcast signal.

According to another aspect of the present invention, a method for controlling a broadcast receiving apparatus includes receiving a broadcast signal, detecting a signal status of the received broadcast signal, and accumulating and storing a status value of the detected broadcast signal.

The method may further include decoding the received broadcast signal, and detecting a signal status of at least one of the received broadcast signal and the decoded broadcast signal and accumulating and storing a status value of the detected broadcast signal.

The method may further include displaying the accumulated status value of the broadcast signal.

The method may further include calculating and storing a statistic regarding the accumulated status value of the broadcast signal, and the displaying operation may display the calculated statistic of the status value of the broadcast signal.

The displaying operation may display the status value of the broadcast signal using at least one of a numerical value and a graph.

The displaying operation may display the statistic of the status value of the broadcast signal using at least one of a numerical value and a graph.

The displaying operation may display the status value of the broadcast signal or the statistic regarding the status value of the broadcast signal such that a time during which the status value of the broadcast signal is less than a predetermined value is distinguished from other times.

The displaying operation may display the status value of the broadcast signal or the statistic regarding the status value of the broadcast signal such that the signal status of the received broadcast signal and the signal status of the decoded broadcast signal are distinguished from each other.

The displaying operation may display at least one of the status value of the broadcast signal and the statistic regarding the status value of the broadcast signal for each channel.

The operation of calculating and storing the statistic may calculate at least one of a total watching time for at least one channel, a time during which the status value of the broadcast signal is less than a predetermined value, a proportion of the time during which the status value of the broadcast signal is less than a predetermined value to the total watching time, and a statistic for a preset time slot, and may provide the result of the calculating.

The signal status of the broadcast signal may indicate at least one of intensity and quality of the broadcast signal.

Accordingly, the past signal status of the broadcast signal can be easily recognized.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
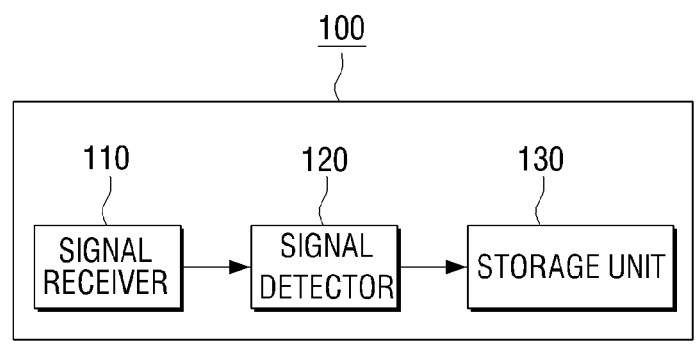
FIG. 1 is a block diagram of a broadcast receiving apparatus consistent with an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a broadcast receiving apparatus according to an exemplary embodiment of the present invention. Referring to FIG. 1, a broadcast receiving apparatus 100 comprises a signal receiver 110, a signal detector 120, and a storage unit 130.

The broadcast receiving apparatus 100 receives diverse video signals, and in particular, receives broadcast signals from an external source and displays them. For example, the broadcast receiving apparatus 100 may be a digital TV, and according to circumstances, may be a computer having a display function, a Digital Multimedia Broadcasting (DMB) receiver, a mobile phone, a personal digital assistant (PDA), a set-top box or a multifunction receiving apparatus selectively integrating the aforementioned devices.

The signal receiver 110 receives broadcast signals through an antenna or a cable or receives images from an external device or an external communication network. For example, if the broadcast receiving apparatus 100 is a digital TV, the signal receiver 100 may be a tuner to tune to a digital television channel.

The signal detector 120 detects a signal status of a broadcast signal received through the signal receiver 110. The signal status of the broadcast signal may be the intensity or quality of the broadcast signal according to circumstances. For example, the signal detector 120 detects a time at which a black screen or screen corruption occurs according to the signal status.

The signal detector 120 may detect the intensity of the signal using one or more of values of a signal noise ratio (SNR) in the receiving frequency band, an AGC, a bit error rate, and a packet error.

The storage unit 130 accumulates and stores a status value of the broadcast signal detected by the signal detector 120. That is, the storage unit 130 accumulates and stores the intensity of the broadcast signal detected by the signal detector 120 in sequence with time.

Figure 2:
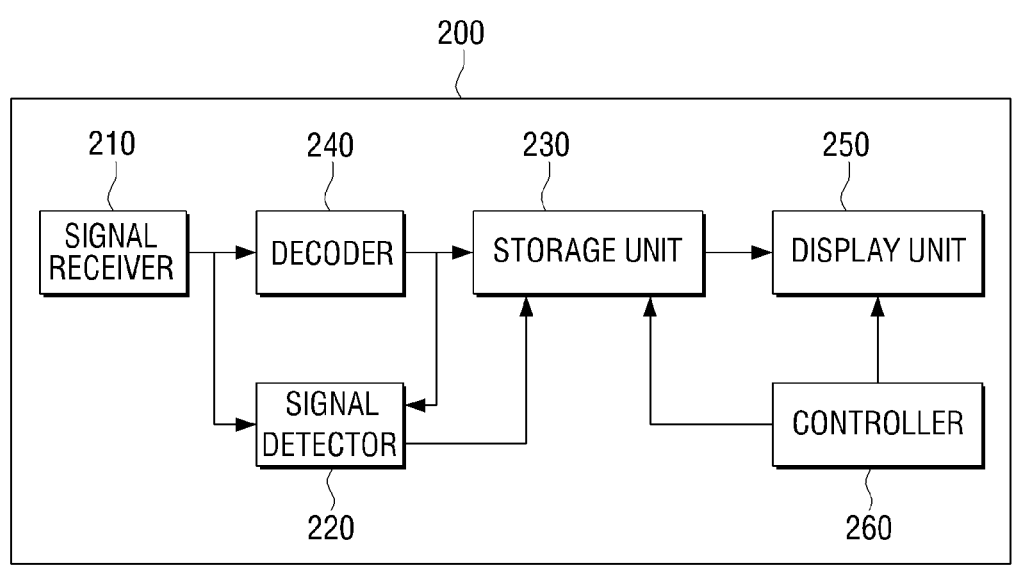
FIG. 2 is a block diagram of a broadcast receiving apparatus consistent with another exemplary embodiment of the present invention.

FIG. 2 is a block diagram of a broadcast receiving apparatus according to another exemplary embodiment of the present invention. Referring to FIG. 2, a broadcast receiving apparatus 200 comprises a signal receiver 210, a signal detector 220, a storage unit 230, a decoder 240, a display unit 250 and a controller 260.

The signal receiver 210 receives broadcast signals through an antenna or a cable or receives images from an external device or an external communication network.

The decoder 240 decodes the broadcast signals received through the signal receiver 210 to extract data broadcast information.

The signal detector 220 detects a signal status of at least one of the broadcast signal received through the signal receiver 210 and the broadcast signal decoded by the decoder 240. The signal status of the broadcast signal may be the intensity or quality of the broadcast signal. Alternatively, the signal status of the broadcast signal may be the intensity of the signal if the broadcast signal is a signal which is received through the signal receiver 210, and may be the quality of signal if the broadcast signal is a signal which is decoded by the decoder 240, for example, by the degree of corruption occurring in the signal by the decoding operation.

For convenience of explanation, it is assumed in the following embodiment that the signal detector 220 detects the intensity of the signal with respect to the broadcast signal received through the signal receiver 210 and detects the quality of signal (or signal corruption) with respect to the broadcast signal decoded by the decoder 240. However, the signal detector 220 can detect any change in the signal status that may occur in the signal receiver 210 and the decoder 240, besides the intensity and the quality of signal.

The signal detector 220 may detect the intensity of the signal using one or more of values regarding SNR in the receiving frequency band, a segment error rate (SER), an auto gain control (AGC), a bit error rate, and a packet error.

For example, according to a method for detecting signal corruption which occurs due to decoding operation, 1 to 10 or more sequence data is encoded and consecutively inserted into a video section of digital image data and then signal corruption is detected if wrong data is inserted into video signals. However, this method is merely exemplary and various other methods can be applied to detect the quality of decoded signal.

The storage unit 230 accumulates and stores a status value of the broadcast signal detected by the signal detector 220. That is, the storage unit 230 accumulates and stores at least one of the intensity and the quality of the broadcast signal detected by the signal detector 220 in sequence with time. The storage unit 230 may be an electrically erasable programmable read-only memory (EEPROM) or a flash ROM which is capable of storing data.

The display unit 250 displays the status value of the broadcast signal accumulated by the storage unit 230. The display unit 250 may display the intensity or the quality of the broadcast signal accumulated in the storage unit 230 in order according to the time. Detailed description thereof will be given later. The display unit 250 may be various types of displays such as a digital light processing (DLP) display, a liquid crystal display (LCD), and a plasma display panel (PDP).

The controller 260 controls entire operation of the broadcast receiving apparatus 200, and in particular, controls the display unit 250 to display the status value of the broadcast signal accumulated in the storage unit 230 using a numerical value or a graph. The graph illustrated herein may be a graph of broken lines, a circular graph, a bar graph, a donut graph, a band graph, or a radar chart.

The controller 260 may display the status value of the broadcast signal or a statistic of the status value of the broadcast signal so as to distinguish a time during which the status value of the broadcast signal is less than a predetermined value from other times. That is, the controller 260 may apply different color, shade, transparency, and highlight so as to distinguish a time (section) during which a normal signal is detected from a time during which a weak or corrupted signal is detected.

Also, the controller 260 may display the status value of the broadcast signal received through the signal receiver 210 and the status value of the broadcast signal decoded by the decoder 240 so as to distinguish the status values from each other. For example, the controller 260 applies different color, shade, transparency, and highlight so as to distinguish a time during which a weak signal is detected from a time during which a corrupted signal is detected.

Figure 3:
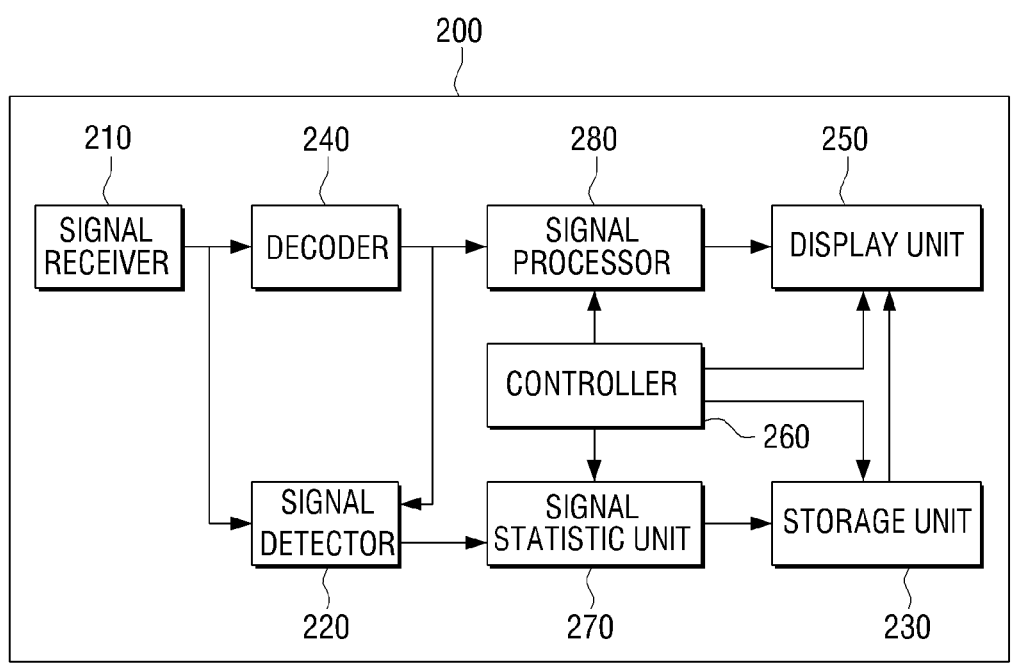
FIG. 3 is a detailed block diagram of the broadcast receiving apparatus of FIG. 2.

FIG. 3 is a detailed block diagram illustrating the broadcast receiving apparatus of FIG. 2. Referring to FIG. 3, the broadcast receiving apparatus 200 comprises the signal receiver 210, the signal detector 220, the storage unit 230, the decoder 240, the display unit 250, the controller 260, a signal statistic unit 270, and a signal processor 280. The same units as illustrated in FIG. 2 will not be described in detail.

The signal receiver 210 receives broadcast signals through an antenna or a cable or receives images from an external device or an external communication network.

The decoder 240 decodes the broadcast signals received through the signal receiver 210 to extract data broadcast information. The decoder 240 may be included in the signal processor 280 which will be described below.

The signal processor 280 processes the signal decoded by the decoder 240 by converting it into a signal of format suitable for the display unit 250.

The signal processor 280 may comprise various components such as an A/D convert for converting analog signals such as component signals or PC-signals into digital signals and a transition minimized differential signaling (TMDS) receiver to divide DVI-signals into R, G, B digital signals and H/V signals.

Also, the signal processor 280 may comprise a scaler to scale the converted signal according to vertical frequency, resolution, and aspect ratio which conform to output standards of the display unit 250. In this case, the display unit 250 may display a video signal which has been processed by the signal processor 280 on a screen.

The signal detector 220 detects a signal status of at least one of the broadcast signal received through the signal receiver 210 and the broadcast signal decoded by the decoder 240, that is, detects the intensity or the quality of the broadcast signal.

The storage unit 230 accumulates and stores a status value of the broadcast signal detected by the signal detector 220. That is, the storage unit 230 accumulates and stores at least one of the intensity and the quality of broadcast signal detected by the signal detector 220 in sequence with time.

The signal statistic unit 270 calculates a statistic regarding the status value of the broadcast signal accumulated in the storage unit 230 and provides the statistic to the storage unit 230.

The signal statistic unit 270 calculates at least one of a total watching time of at least one channel, a time during which the status value of the broadcast signal is less than a predetermined value, a proportion of the time during which the status value of the broadcast signal is less than a predetermined value to the total watching time, and a statistic for a preset time slot, and provides the calculated result to the storage unit 230.

For example, if the total watching time of a predetermined channel is 1857 hours and the time during which the intensity value of broadcast signal corresponding to the channel is less than a predetermined value is 37 hours, the proportion of the time during which the status value of the broadcast signal is less than a predetermined value to the total watching time, that is, the signal defective proportion is 1.99%. Such values are calculated and provided to the storage unit 230. Also, for example, a statistic for a preset time slot, such as 70% to the forenoon, 20% to the afternoon, and 10% to the evening, is calculated and provided to the storage unit 230.

The display unit 250 may display at least one of the status value of the broadcast signal accumulated in the storage unit 230 and the statistic calculated by the signal statistic unit 270.

The controller 260 may control the display unit 250 to display at least one of the status value of the broadcast signal accumulated in the storage unit 230 and the statistic calculated by the signal statistic unit 270 using a numerical value or a graph.

The controller 260 may display the status value of the broadcast signal or the statistic regarding the status value of the broadcast signal so as to distinguish the time during which the status value of the broadcast signal is less than a predetermined value from other times. For example, if the intensity of broadcast signal is less than a predetermined value, the controller 260 may apply different color, shade, transparency or highlight so as to distinguish the signal from a normal signal.

The controller 260 may display the signal status of the broadcast signal received through the signal receiver 210 and the signal status of the broadcast signal decoded by the decoder 240 so as to distinguish the signal statuses from each other. For example, the controller 260 may apply different color, shade, brightness, transparency, or highlight to the broadcast signal decoded by the decoder 240 so as to distinguish the signal status of the decoded broadcast signal from the signal status of the broadcast signal received through the signal receiver 210.

Also, the controller 260 may display the status value of the broadcast signal and the statistic regarding the status value of the broadcast signal for each channel.

Detailed embodiments in relation to the above description will be provided below with reference to FIGS. 4A to 6C. In the following embodiments, it is assumed that the state in which a signal of weak intensity is received is expressed as "failed signal state" and the state in which a signal is corrupted less than a predetermined value due to decoding is expressed as "corrupted signal state".

Figure 4A:
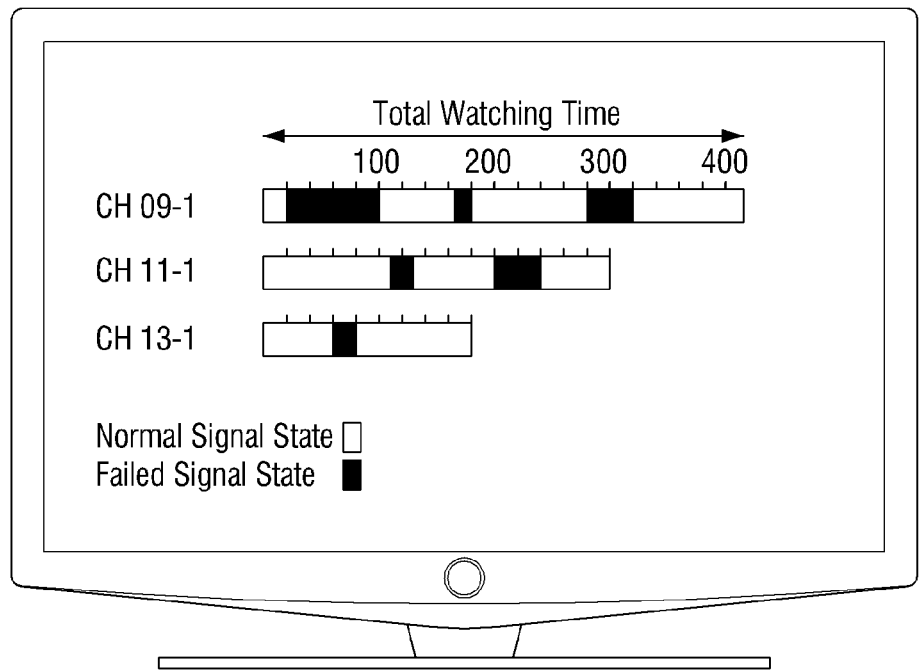
FIGS. 4A to 4C are views illustrating displaying a status value of a broadcast signal consistent with an exemplary embodiment of the present invention.
Figure 4B:
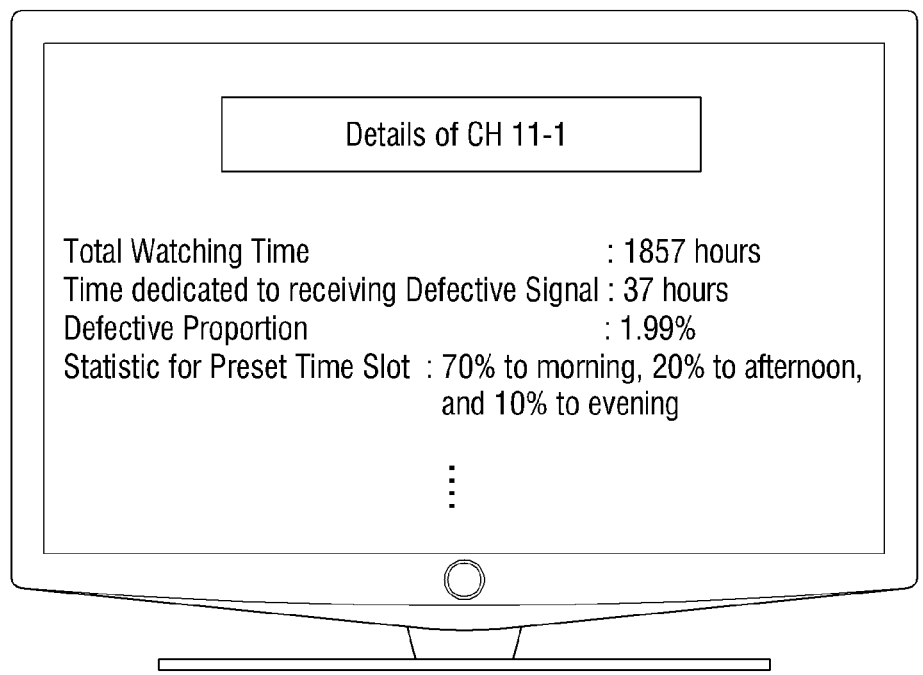
Figure 4C:
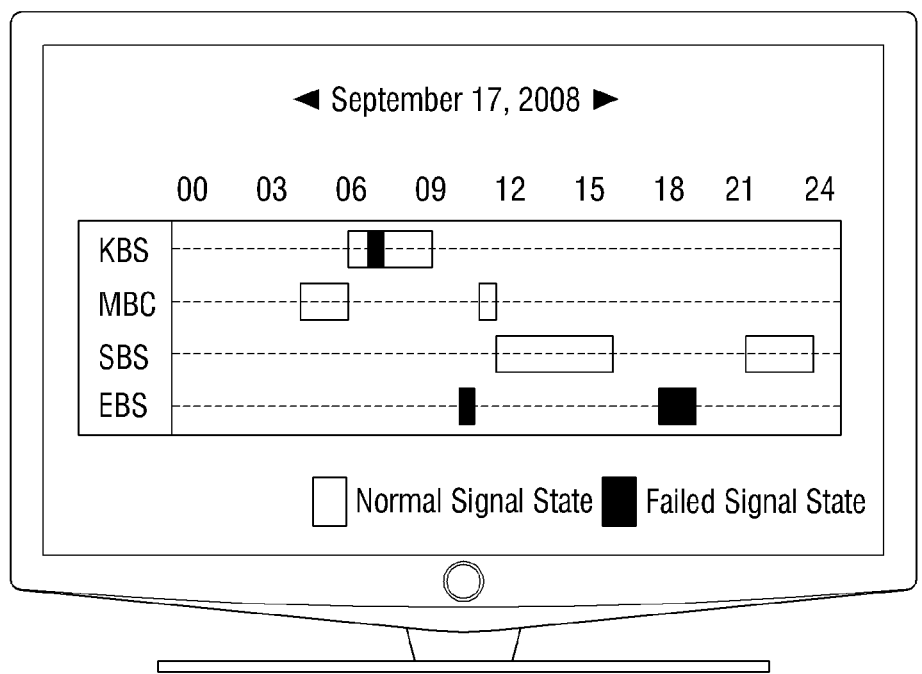

FIGS. 4A to 4C are views illustrating displaying the status value of the broadcast signal according to an exemplary embodiment of the present invention.

Referring to FIG. 4A, the total watching time for each channel and the proportion of the time during which a defective signal is detected to the total watching time are displayed using a bar graph. For example, the total watching time may be displayed in the unit of reference time (for example, in the unit of 100 hours). The time during which a normal signal is detected is expressed by a white box "☐" and the time during which a defective signal is detected is expressed as a black box "■". The normal signal state and the failed signal state may be indicated by the intensity or quality of the broadcast signal. For example, the failed signal state may be indicated by combining the intensity and the quality of the broadcast signal or may be displayed by distinguish the intensity and the quality of the broadcast signal.

Referring to FIG. 4B, a statistic regarding the signal status of the broadcast signal of a specific channel (for example, channel 11-1) may be displayed numerically. For example, if a user selects a specific channel, for example, CH 11-1 from the display of FIG. 4A, a statistic regarding the corresponding channel may be displayed. The statistic regarding the status value of the broadcast signal of a specific channel may include the total watching time (1857 hours), the time during which the status value of the broadcast signal is less than a predetermined value, that is, the signal defective time (37 hours), the proportion of the time during which the status value of the broadcast signal is less than a predetermined value to the total watching time, that is, the signal defective proportion (1.99%), and a statistic for a preset time slot (for example, 70% to the morning, 20% to the afternoon, and 10% to the evening). However, this is merely an example and it is possible to suggest various methods for displaying the statistic regarding the status value of the broadcast signal.

Referring to FIG. 4C, the status value of the broadcast signal for each channel at a predetermined date (for example, Sep. 17, 2008) is displayed using a graph. As shown in FIG. 4C, all time slots of the corresponding date are displayed and the time slot for a normal signal state is displayed distinctly from the time slot for a failed signal state.

Figure 5A:
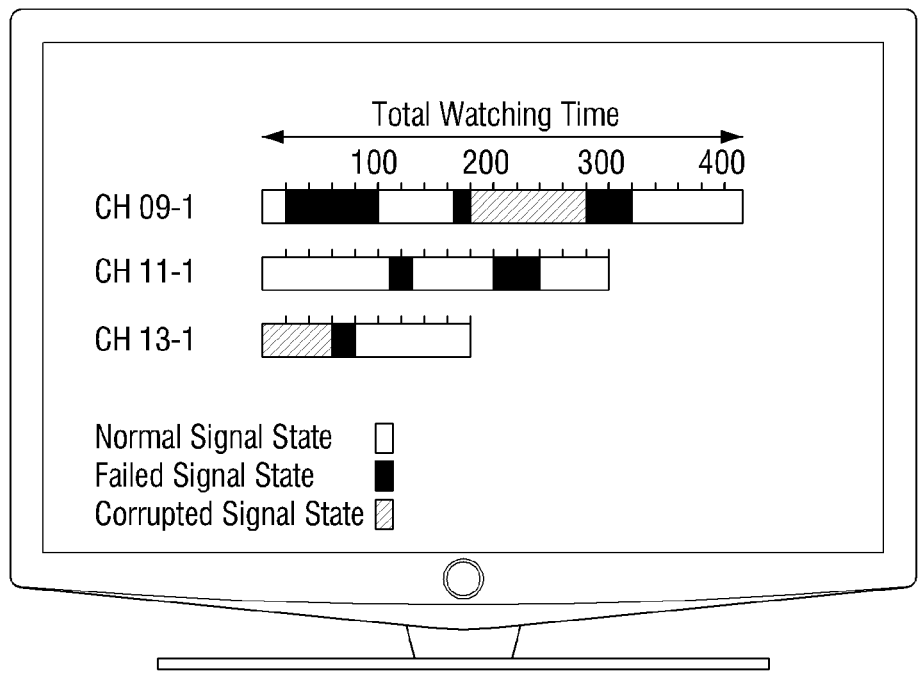
FIGS. 5A to 5C are views illustrating displaying a status value of a broadcast signal consistent with another exemplary embodiment of the present invention.
Figure 5B:
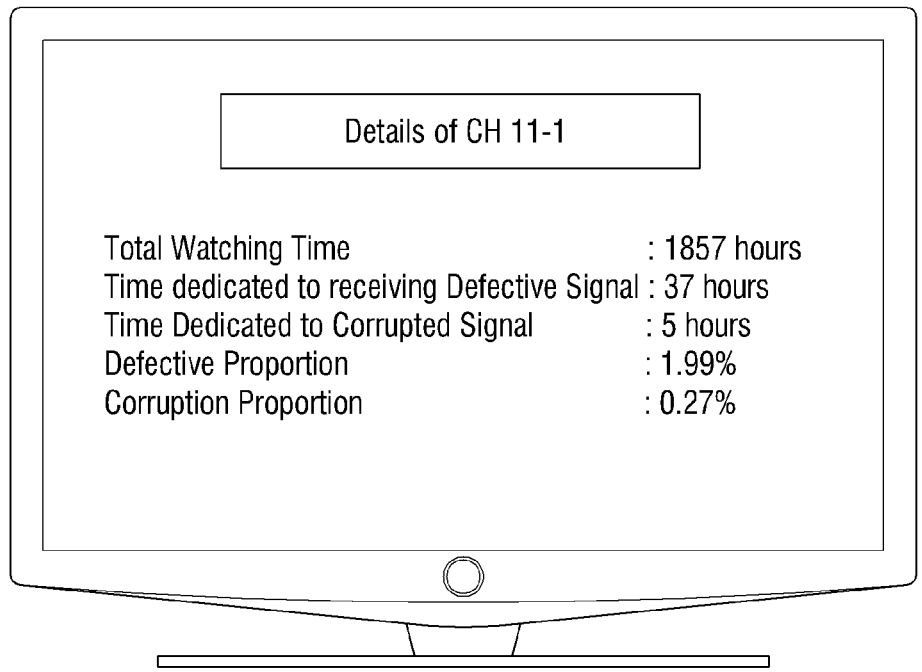
Figure 5C:
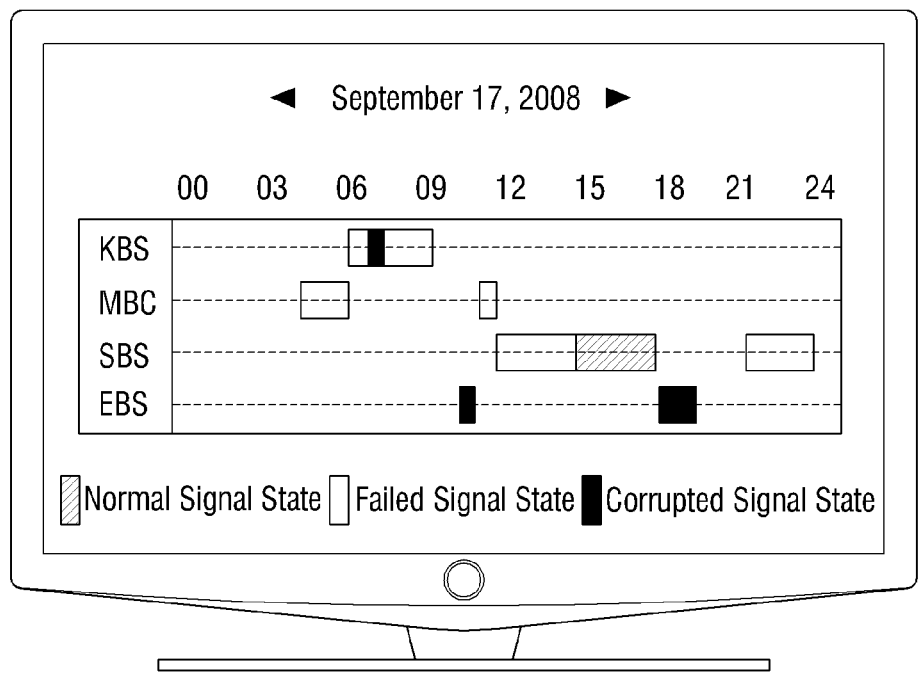

FIGS. 5A to 5C are views illustrating displaying the status value of the broadcast signal according to another exemplary embodiment of the present invention.

Referring to FIG. 5A, the total watching time for each channel and the proportions of the time during which a defective signal and a corrupted signal are detected to the total watching time are displayed using a graph. For example, the state in which the intensity of a signal received through a tuner is less than a predetermined value is expressed as "failed signal state" (■), and the state in which the quality of a signal is less than a predetermined value due to decoding is expressed as "corrupted signal state" (▲), so that the intensity of the received signal and the degree of corruption of a decoded signal are distinctly displayed. However, this is merely an example and diverse terms such as "weak signal state", "intensity defective signal state", "quality defective signal state", and "corruption defective signal state" that can be recognized by the user may be used. Also, the graphics are displayed in various methods of applying different shade, transparency, and color.

Referring to FIG. 5B, a statistic regarding the status value of the broadcast signal of a specific channel (for example, CH 11-1) are numerically displayed. For example, if a user selects a specific channel, for example, CH 11-1 from the display of FIG. 5A, a statistic regarding the corresponding channel is displayed. The statistic regarding the status value of the broadcast signal of a specific channel may comprise a total watching time (1857 hours), a time during which an intensity value of a broadcast signal is less than a predetermined value, that is, the time dedicated to receiving a defective signal (37 hours), a time during which a corruption value of a broadcast signal is less than a predetermined value, that is, the time dedicated to receiving a corrupted signal (5 hours), a proportion of the time during which the intensity value of the broadcast signal is less than a predetermined value to the total watching time, that is, a signal defective proportion (1.99%), and a proportion of the time during which the corruption value of the broadcast signal is less than a predetermined value to the total watching time, that is, a signal corruption proportion (0.27%).

Referring to FIG. 5C, the signal status of the broadcast signal for each channel at a specific date (for example, Sep. 17, 2008) is displayed using a graph. As shown in FIG. 5C, all time slots of the corresponding date are displayed and the time slot for a normal signal state, the time slot for a failed signal state in which the intensity of received signal is less than a predetermined value, and the time slot for a corrupted signal state in which the degree of corruption of decoded signal is less than a predetermined value are distinctly displayed.

Figure 6A:
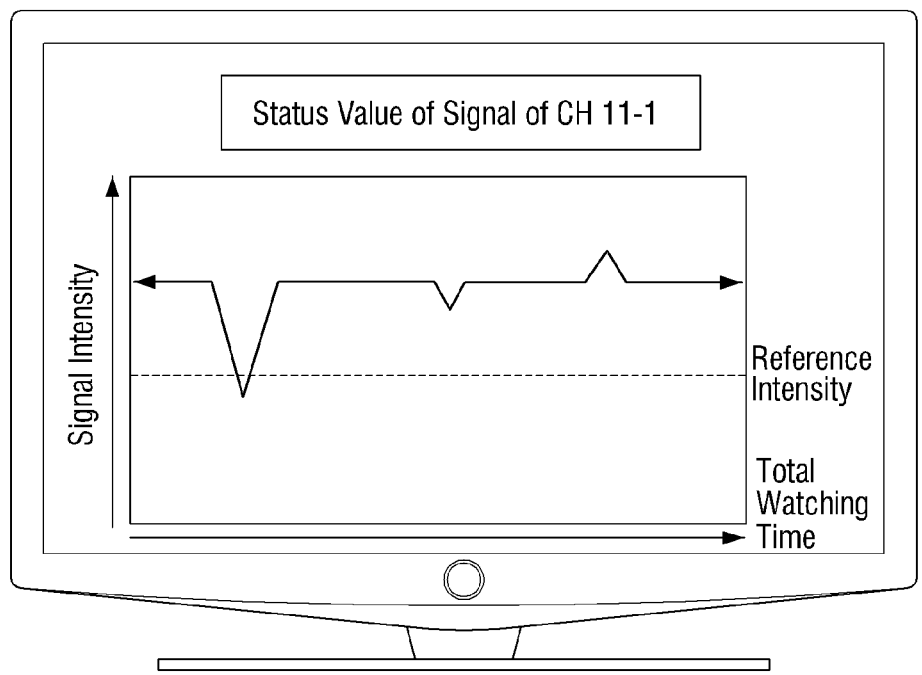
FIGS. 6A to 6C are views illustrating displaying a status value of a broadcast signal consistent with various exemplary embodiments of the present invention.
Figure 6B:
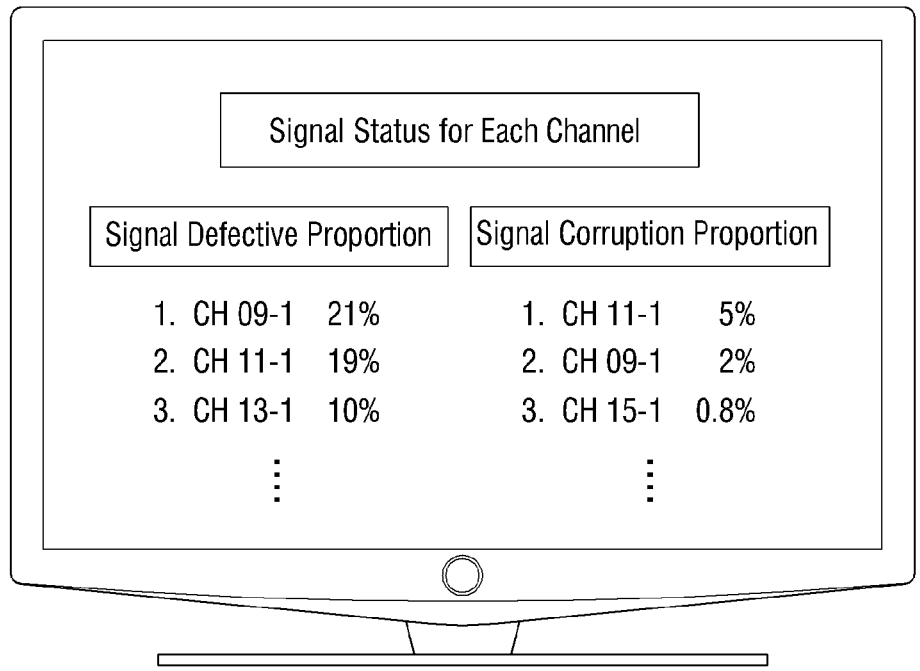
Figure 6C:
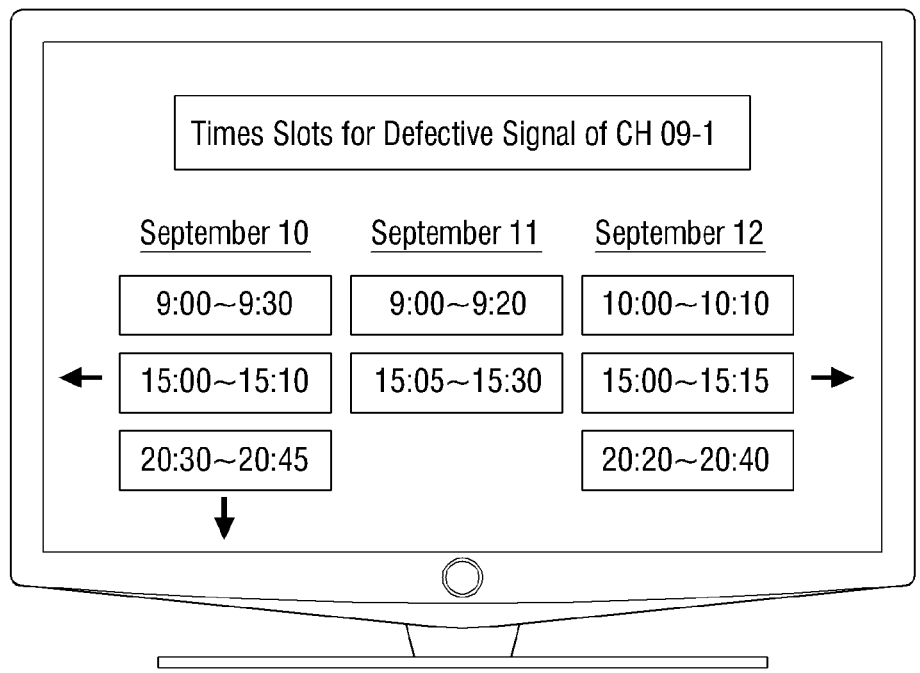

FIGS. 6A to 6C are views illustrating displaying the status value of the broadcast signal according to diverse exemplary embodiments of the present invention.

Referring to FIG. 6A, a status value of a signal corresponding to a specific channel, for example, channel CH 11-1 is displayed using a graph of broken line. In this graph, a reference intensity based on which a normal signal (normal intensity) or a defective signal (weak intensity) is distinguished is displayed so that the user can recognize the degree of defective. Of course, the graph of broken line is substituted for a vertical bar graph.

Referring to FIG. 6B, the signal status for each channel can be displayed for comparison with that of other channel. That is, a signal defective proportion, indicating a proportion of a time during which the intensity of broadcast signal is less than a predetermined value to a total watching time, and a signal corruption proportion, indicating a proportion of a time during which the degree of corruption of decoded signal is less than a predetermined value to a total watching time, are numerically displayed for each channel in decreasing order. Of course, one of the signal defective proportion and the signal corruption proportion may be displayed or the signal defective proportion and the signal corruption proportion may be displayed in combination.

Referring to FIG. 6C, a period of time during which a defective signal is detected is displayed for each date for a specific channel. In this case, the date that is not displayed can be checked by using a direction key, a scroll bar or a number key.

Figure 7:
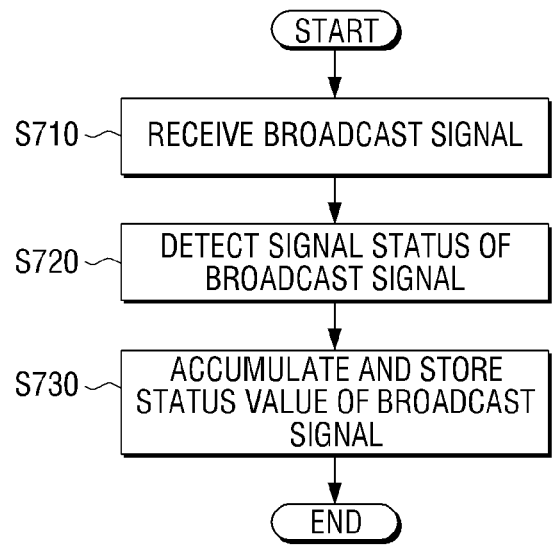
FIG. 7 is a flowchart outlining a method for controlling a broadcast receiving apparatus consistent with an exemplary embodiment of the present invention.

FIG. 7 is a flowchart illustrating a method for controlling a broadcast receiving apparatus according to an exemplary embodiment of the present invention.

Referring to FIG. 7, if a broadcast signal is received through a tuner (S710), a signal status of the received broadcast signal is detected (S720). The signal status may be the intensity of broadcast signal or the quality of broadcast signal according to circumstances.

Next, a status value of the detected broadcast signal is accumulated and stored (S730). The status value of the broadcast signal accumulated in operation S730 may be displayed. In this case, the status value of the broadcast signal may be displayed such that a time during which the status value of the broadcast signal is less than a predetermined value is distinguished from other times. Also, the accumulated status value of the broadcast signal may be displayed using a graph or a numerical value.

Also, the received broadcast signal may be decoded, a signal status of at least one of the received broadcast signal and the decoded broadcast signal may be detected, and the detected status value of the broadcast signal may be accumulated and stored. In this case, the signal status of the broadcast signal received through a tuner and the signal status of the decoded broadcast signal are distinctly displayed.

Figure 8:
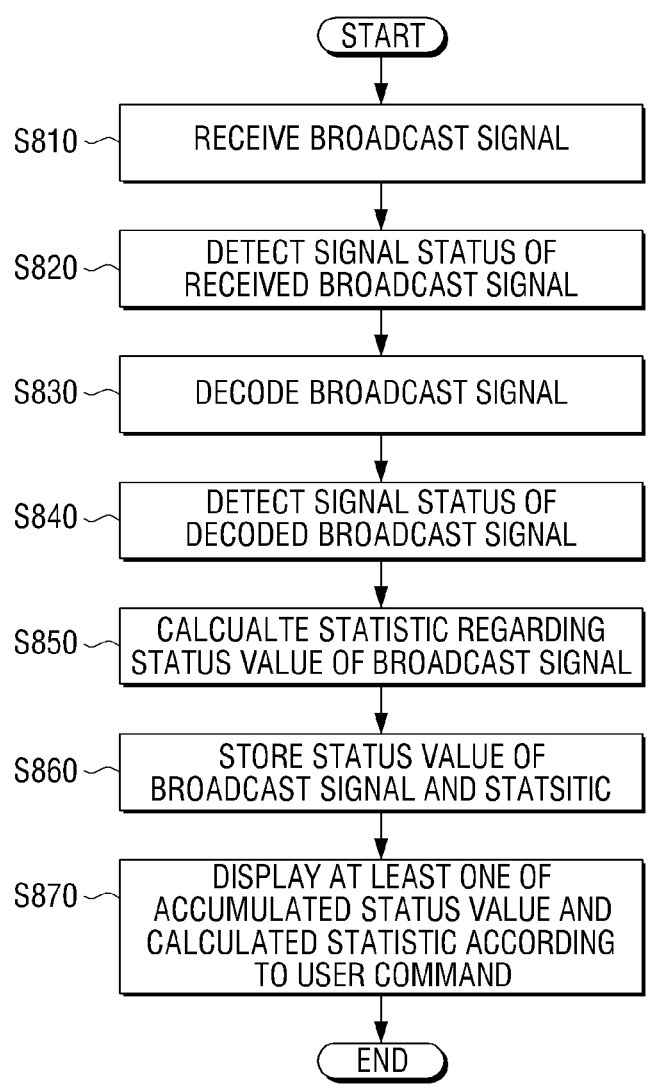
FIG. 8 is a flowchart outlining a method for controlling a broadcast receiving apparatus consistent with another exemplary embodiment of the present invention.

FIG. 8 is a flowchart illustrating a method for controlling a broadcast receiving apparatus according to another exemplary embodiment of the present invention.

Referring to FIG. 8, if a broadcast signal is received through a tuner (S810), a signal status of the received broadcast signal is detected (S820). The signal status may be the intensity of the received broadcast signal or the quality of the signal according to circumstances.

Next, the received broadcast signal is decoded (S830) and a signal status of the decoded broadcast signal is detected (S840). The signal status of the decoded broadcast signal may be the degree of corruption occurring in the signal by decoding.

Next, a statistic regarding the detected status value of the broadcast signal is calculated. The detected status value of the broadcast signal may be at least one of the status value of the broadcast signal received through a tuner and the status value of the decoded broadcast signal. That is, the status value may be an intensity value of a signal if the signal is a broadcast signal received through a tuner, and may be a degree of corruption of a signal if the signal is a decoded broadcast signal. However, this is merely an example, and according to circumstances, the status value may be the quality of a signal even if the signal is a broadcast signal received through a tuner.

The statistic regarding the status value of the broadcast signal may be at least one of a total watching time for at least one channel, a time during which the status value of the broadcast signal is less than a predetermined value, a proportion of the time during which the status value of broadcast signal is less than a predetermine value to the total watching time, and a statistic for a preset time slot.

The status value of the broadcast signal is accumulated and stored and the statistic calculated in operation S850 is stored (S860).

At least one of the accumulated status value and the calculated statistic is displayed according to a command by a user (S870). In this case, the status value of the broadcast signal is displayed using at least one of a numerical value and a graph. The graph may be a graph of broken line, a circular graph, a bar graph, a donut graph, a band graph, and a radar chart.

The status value of the broadcast signal or the statistic regarding the status value of the broadcast signal may be displayed such that the time during which the status value is less than a predetermined value is distinguished from other times.

Also, the signal status of the received broadcast signal and the signal status of the decoded broadcast signal are distinguished from each other when being displayed.

Also, at least one of the status value of the broadcast signal and the statistic regarding the status value of the broadcast signal may be displayed for each channel.

In distinguish the broadcast signals, different color, brightness, transparency, and highlight may be used.

The order of the respective step described above is only for convenience of explanation and accordingly may change according to circumstances. For example, operation S860 of accumulating and storing the status value of the broadcast signal is performed after operation S850 of calculating the statistic of the broadcast signal, but operation S860 is performed after operation S820 of detecting the signal status of the received broadcast signal.

Accordingly, the user can easily understand the signal status of the broadcast receiving apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast receiving apparatus comprising:
   a signal receiver which receives a broadcast signal;
   a signal detector which detects at least one of an intensity and a quality of the broadcast signal corresponding to a signal status of the received broadcast signal;
   a storage unit which accumulates and stores the at least one of the intensity and the quality detected by the signal detector in sequence with time;
   a signal statistic unit which calculates a statistic regarding the accumulated at least one of the intensity and the quality of the broadcast signal for a plurality of channels and stores the statistic in the storage unit; and
   a display unit which displays at least one of a numerical value and a graph of the statistic of the accumulated at least one of the intensity and the quality of at least one channel of the plurality channels,
   wherein the statistic comprises at least two from among a statistic indicating an amount of time of a normal signal state of the at least one channel, a statistic indicating an amount of time of a failed signal state of the at least one channel, a statistic indicating an amount of time of a corrupted signal state of the at least one channel, a statistic indicating a proportion of an amount of time of a failed signal state to a total watching time of the at least one channel, and a statistic indicating a proportion of an amount of time of time of a corrupted signal state to a total watching time of the at least one channel.

2. The broadcast receiving apparatus as claimed in claim 1, wherein the display unit displays the accumulated at least one of the intensity and the quality of the at least one channel.

3. The broadcast receiving apparatus as claimed in claim 2, further comprising a controller which controls the display unit to display the accumulated at least one of the intensity and the quality of the at least one channel using at least one of a numerical value and a graph.

4. The broadcast receiving apparatus as claimed in claim 1, further comprising a controller which controls the display unit to display the statistic regarding the at least one of the intensity and the quality of the at least one channel using at least one of a numeral value and a graph.

5. The broadcast receiving apparatus as claimed in claim 4, wherein the controller displays the at least one of the intensity and the quality of the at least one channel or the statistic regarding the at least one of the intensity and the quality of the at least one channel such that a time during which the at least one of the intensity and the quality of the at least one channel is less than a predetermined value is distinguished from other times.

6. The broadcast receiving apparatus as claimed in claim 4, wherein the controller displays the at least one of the intensity and the quality of the at least one channel and the statistic regarding the at least one of the intensity and the quality of the at least one channel for each of a plurality of channels of the broadcast signal.

7. A method for controlling a broadcast receiving apparatus, the method comprising:
receiving a broadcast signal;
detecting at least one of an intensity and a quality of the broadcast signal corresponding to a signal status of the received broadcast signal during a broadcast television watching period;
accumulating and storing the at least one of the intensity and the quality of the broadcast signal in sequence with time; and
calculating and storing a statistic regarding the accumulated at least one of the intensity and the quality of the broadcast signal,
wherein the broadcast signal comprises a broadcast television signal, and
wherein the calculating and storing the statistic comprises calculating at least one of a total watching time for at least one channel of the broadcast signal, a time during which the at least one of the intensity and the quality of the broadcast signal is less than a predetermined value, a proportion of the time during which the at least one of the intensity and the quality of the broadcast signal is less than a predetermined value to the total watching time, and a statistic for a preset time slot, and storing a result of calculating.

8. The method as claimed in claim 7, further comprising displaying the accumulated at least one of the intensity and the quality of the broadcast signal.

9. The method as claimed in claim 7, wherein the displaying comprises displaying the calculated statistic of the at least one of the intensity and the quality of the broadcast signal.

10. The method as claimed in claim 8, wherein the displaying comprises displaying the at least one of the intensity and the quality of the broadcast signal using at least one of a numerical value and a graph.

11. The method as claimed in claim 9, wherein the displaying comprises displaying the statistic of the at least one of the intensity and the quality of the broadcast signal using at least one of a numerical value and a graph.

12. The method as claimed in claim 9, wherein the displaying comprises displaying the at least one of the intensity and the quality of the broadcast signal or the statistic regarding the at least one of the intensity and the quality of the broadcast signal such that a time during which the at least one of the intensity and the quality of the broadcast signal is less than a predetermined value is distinguished from other times.

13. The method as claimed in claim 9, wherein the displaying comprises displaying the at least one of the intensity and the quality of the broadcast signal and the statistic regarding the at least one of the intensity and the quality of the broadcast signal for each of a plurality of channels of the broadcast signal.

14. A method for controlling a broadcast receiving apparatus comprising:
receiving, by the broadcast receiving apparatus, a broadcast signal;
monitoring the broadcast signal to detect a signal status of the broadcast signal at a plurality of times during a broadcast television watching period;
accumulating and storing the detected signal statuses in a computer readable storage medium; and
calculating and storing a statistic regarding the accumulated detected signal statuses in a computer readable storage medium,
wherein the signal status of the broadcast signal indicates at least one of an intensity and a quality of the received broadcast signal, and
wherein the broadcast signal comprises a broadcast television signal, and
wherein the calculating and storing the statistic comprises calculating at least one of a total watching time for at least one channel of the broadcast signal, a time during which the at least one of an intensity and a quality of the broadcast signal is less than a predetermined value, a proportion of the time during which the at least one of the intensity and the quality of the broadcast signal is less than a predetermined value to the total watching time, and a statistic for a preset time slot, and storing a result of calculating.

15. A broadcast receiving apparatus comprising:
a signal receiver which receives a broadcast signal;
a signal detector which detects an intensity and a quality of the broadcast signal; and
a display unit which displays at least one of a numerical value and a graph regarding the intensity and the quality of the broadcast signal.

16. The broadcast receiving apparatus as claimed in claim 15, wherein the controller displays at least one of the numerical value and the graph regarding the intensity and the quality of the broadcast signal for each of a plurality of channels of the broadcast signal.

17. The broadcast receiving apparatus as claimed in claim 16, wherein when channel is changed the controller displays at least one of the numerical value and the graph regarding the intensity and the quality of the broadcast signal corresponding to the changed channel.

18. The broadcast receiving apparatus as claimed in claim 15, wherein the graph comprises at least one of graph of broken lines, a circular graph, a bar graph, a donut graph, a band graph, and a radar chart.

* * * * *